United States Patent [19]

Kanome et al.

[11] Patent Number: 5,059,018
[45] Date of Patent: Oct. 22, 1991

[54] COLORED CONTACT LENS

[75] Inventors: Shinji Kanome, Kawana; Masuji Ichihara, Aichi, both of Japan

[73] Assignee: Menicon Co., Ltd., Nagoya, Japan

[21] Appl. No.: 537,952

[22] Filed: Jun. 14, 1990

[51] Int. Cl.⁵ ............................................. G02C 7/04
[52] U.S. Cl. ................................. 351/162; 351/160 H
[58] Field of Search .............. 351/160 R, 160 H, 161, 351/162

[56] References Cited

U.S. PATENT DOCUMENTS 3,712,718  1/1973  LeGrand ............................. 351/162
4,558,931 12/1985  Fuhrman ............................ 351/162
4,576,453  3/1986  Borowsky ........................... 351/162
4,582,402  4/1986  Knapp ................................ 351/162

Primary Examiner—Scott J. Sugarman
Attorney, Agent, or Firm—Armstrong, Nikaido, Marmelstein, Kubovcik, & Murray

[57] ABSTRACT

A contact lens having a circular colored area at center thereof, and has a mark arranged in the colored area. The mark is provided by applying deeper or different color on the colored area, or provided by masking the contact lens before applying color of the colored area.

15 Claims, 3 Drawing Sheets 5,059,018

COLORED CONTACT LENS

BACKGROUND OF THE INVENTION

The present invention relates to a contact lens, and more particularly, to a colored contact lens.

It has been known that a colored contact lens is useful for softening dazzling light to protect the user's eye. Further, such colored contact lens is easy to find when the lens is dropped, and improves the merchandizing image.

However, as shown in FIG. 14, a general contact lens L is larger than a colored portion H of an eye, and therefore, the periphery of the lens covers a ring-like portion S1 of a sclera (white portion of the eye) S surrounding an iris I. Therefore, if the whole of contact lens L is colored, the white sclera seems to be partially colored, and the use of contact lens can be easily found by another person.

Further, there has been known a contact lens which has small letters and/or mark a (hereinafter referred to as "mark") M at a periphery of the lens L in order to make a distinction between the front and rear of a lens, or between left and right ones of a pair of contact lenses. Further, the standard or kind of the lens is also shown with small marks in order to make easy the divisions or regulations.

However, there is also disadvantage that such small marks M presented at the periphery of the lens L appear on the white sclera portion S as shown in FIG. 14.

The object of the present invention is to provide a contact lens which can soften dazzling light, which can be easily found when the lens is dropped, which improves the merchandise image, which is easy to make distinction between a front face and a rear face, and between left and right and to make easy the divisions and regulations, and further, which does not color the white sclera portion.

SUMMARY OF THE INVENTION

According to the present invention, there is provided a contact lens having a substantially circular colored area with a color at the center thereof, and a mark, for example indicia, arranged in the colored area.

In general case, the color of the colored area is light-transmittable. However, the contact lens is used as a cosmetic lens for an artificial eye, non-light-transmittable color is used.

The mark can be provided by adding the same but deeper color or a different color, and can also be provided as a non-colored letter constituting indicia and/or mark in the circular colored area.

The above-mentioned circular colored area preferably has a diameter of 5 to 10 mm (more preferably 6 to 9 mm). That is to say, when the diameter is larger than the upper limit, the colored area cannot be sufficient hidden in a horny coat area (iris area I in FIG. 13) of the user's eye. When the diameter is smaller than the lower limit, the mark in the colored area cannot be clearly recognized.

Further, the above-mentioned non-colored mark preferably has an area size not more than 10% (more preferably 5%) of the colored area. That is to say, if the area of the non-colored mark is larger than 10%, sunglass-effect (light-shield effect) is not sufficient.

Further, the above-mentioned mark preferably has a non-symmetric shape so that the user can easily make distinction between the front face and the rear face of the lens.

In a preferable case, the colored circle area includes a coloring matter having property to shield ultraviolet light, in order to protect an eye from ultraviolet light.

Hereinafter, several embodiments of the present invention will be explained with reference to the attached drawings.

DETAILED DESCRIPTION

Figure 1:
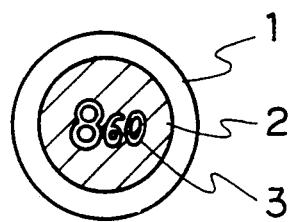
FIGS. 1 to 6 are front views showing embodiments of the contact lens of the first aspect of the present invention, respectively.

As shown in FIG. 1, the contact lens 1 has a circular colored area 2 at the center portion thereof. However, as to the shape of colored area, geometrically accuracy is not required. The colored area 2 can be provided by applying dyes through known art.

Figure 2:
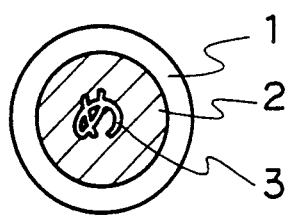
Figure 3:
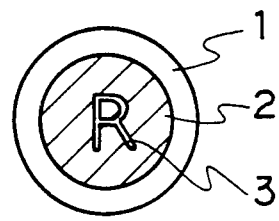
Figure 4:
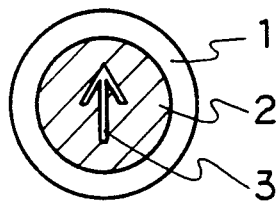

In the embodiment shown in FIG. 1, a mark 3 is provided in the colored area 2 as superimposed lines, points, or the like, by additionally applying deeper or different color dyes. In the present invention, the kind of mark is not limited. For example, the numeral mark 3 shown in FIGS. 1 and 5, the mark 3 of Japanese "Kana" shown in FIG. 2, alphabet mark 3 shown in FIG. 3, and an arrow mark 3 shown in FIG. 4 are included in the concept of mark.

As material of the above-mentioned contact lens, a hydrophilic polymer including hydrophilic monomer, for example, 2-hydroxy ethylmethacrelate, N-vinylpyrrolidone, or dimethylacrylicamide; and a hydrophobic polymer such as silicone rubber, polymer including hydrophobic monomer such as butylacrylate, fluoroalkylacrylate, polymerizable polyorganosiloxane can be employed for a soft contact lens.

Further, a hydrophobic polymer including hydrophobic monomer such as alkyl(meth) acrylate, silicon-containing monomer, fluorine-containing monomer can be employed for a (hydrophobic) hard contact lens.

However, the contact lens material is not particularly limited to the above mentioned.

The circular colored area 2 is concentric with the lens 1 itself, and has a diameter of about 20 through 95% preferably, about 50 through 90%, of the diameter of the lens.

Figure 13:
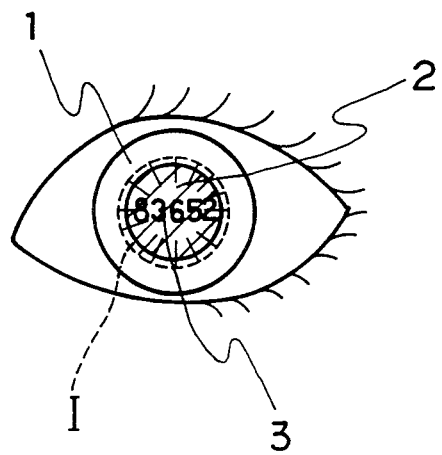
FIG. 13 is a front view of an embodiment of the contact lens of the present invention which is attached on an eye.
Figure 14:
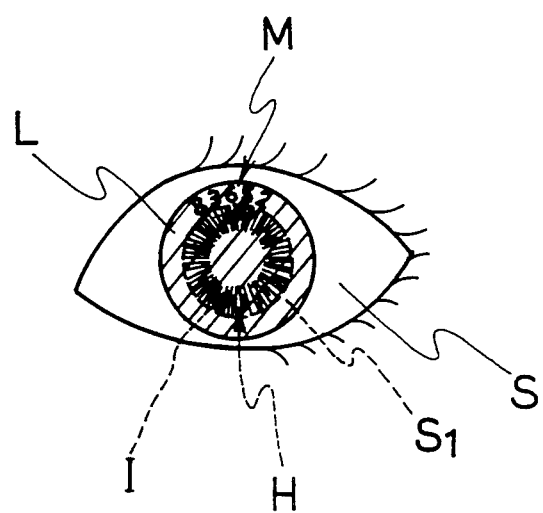
FIG. 14 is a front view of an example of a conventional contact lens which is attached on an eye.

If the diameter of the colored circle is smaller than 20%, the light-softening effect is not sufficient, and if the diameter is larger than 95%, the colored area comes over the white sclera portion (S in FIG. 13).

Figure 5:
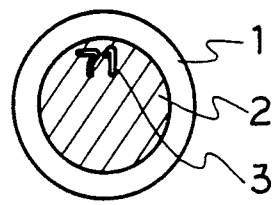
Figure 6:
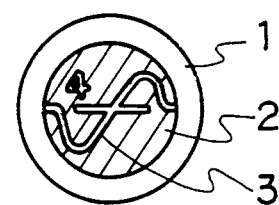
Figure 7:
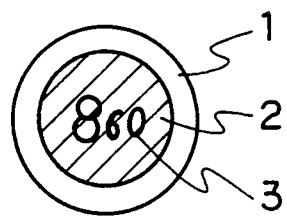
FIGS. 7 to 12 are front views showing embodiments of the contact lens of the second aspect of the present invention, respectively.
Figure 8:
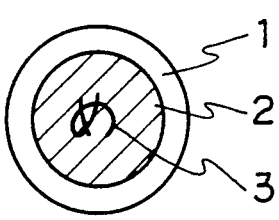
Figure 9:
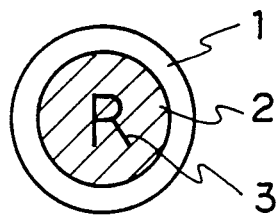
Figure 10:
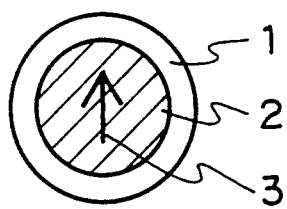
Figure 11:
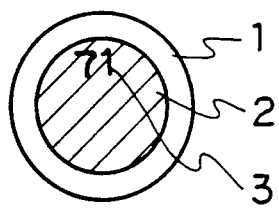
Figure 12:
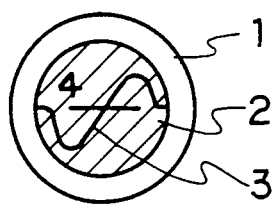

Position and direction of the mark 3 is not limited. That is, the mark 3 can be positioned at the center of the colored area 2 as shown in FIGS. 1 through 4, and can also be positioned at periphery of the colored area 2 as shown in FIG. 5. In both cases, of course, the user is not disturbed by the marks.

In the embodiment of FIGS. 1 through 6, the mark 3 is a supperimposed lines or the like with applying additional dyes. However, the mark 3 can be advantageously provided by non-colored lines, points, or the like as shown in FIGS. 7 through 12. The marks 3 of FIGS. 7, 8, 9, 10, 11 and 12 correspond to the marks of FIGS. 1, 2, 3, 4, 5 and 6, respectively.

The non-colored mark can be provided by masking the contact lens before application of dyes for the circular colored portion 2. Then, the masked area remains without colored.

As described above, in the first aspect case where a deeper or different color is applied on the basic colored area, two or more dyes-application steps, i.e. coloring step for the colored area and the additional coloring step for the marks, are required.

On the contrary, when the marks 3 are provided in the colored area 2 by remaining as non-colored transparent area, only one coloring step is advantageously required.

The size of the letter or mark 3 in the colored area 2 is preferably about 1 mm in diameter, since the letters or marks smaller than 1 mm cannot be clearly recognized.

As the dyeing process for the colored area 2 and the marks 3, screen print method disclosed in Japanese Unexamined Patent Publication No. 120912/1982, attachment-jig method disclosed in Japanese Unexamined Patent Publication No. 73228/1987 and transcription method using a stamp or the like can be employed.

In the above dyeing process, various types of dyes, for example, vat dyes, reactive dyes and azoic dyes, can be employed.

To be concrete, as vat dyes, for example, C.I. Vat Yellow 2, C.I. Vat Orange 1, C.I. Vat Orange 5, C.I. Vat Orange 9, C.I. Vat Red 1, C.I. Vat Red 10, C.I. Vat Red 13, C.I. Vat Blue 6, C.I. Vat Green 1, C.I. Vat Green 3, C.I. Vat Brown 3, etc. can be used.

As reactive dyes, C.I. Reactive Yellow 2, C.I. Reactive Yellow 4, C.I. Reactive Yellow 15, C.I. Reactive Orange 1, C.I. Reactive Orange 16, C.I. Reactive Red 3, C.I. Reactive Red 4, C.I. Reactive Red 11, C.I. Reactive Red 21, C.I. Reactive Blue 2, C.I. Reactive Blue 4, C.I. Reactive Blue 5, C.I. Reactive Blue 21, etc. can be used.

Further, as azoic dyes, for example, combination of one of the first group including C.I. Azoic Diazo Component 20, C.I. Azoic Diazo Component 22, C.I. Azoic Diazo Component 35, C.I. Azoic Diazo Component 38, etc. and one of another group including C.I. Azoic Coupling Component 4, C.I. Azoic Coupling Component 8, C.I. Azoic Coupling Component 10, C.I. Azoic Coupling Component 11, C.I. Azoic Coupling Component 12, C.I. Azoic Coupling Component 14, C.I. Azoic Coupling Component 17, C.I. Azoic Coupling Component 18, C.I. Azoic Coupling Component 19, C.I. Azoic Coupling Component 20, etc can be employed.

Hereinafter, some examples of preparation of contact lens of the present invention will be explained. However, the scope of the present invention is not limited to such examples.

PREPARATION EXAMPLE 1

Preparation of Coloring Liquid

A 25 ml solution of C.I. Vat Blue 6 of 4% and hydrosulfite of 4% resolved in 4% aqueous solution of caustic soda (sodium hydroxide) under reductive condition was prepared, and then 75 ml 4% aqueous solution of sodium alginate was added and blended in the solution obtained as mentioned above to prepare a coloring liquid.

PREPARATION EXAMPLE 2

Preparation of Coloring Liquid

A 25 ml solution of C.I. Vat Blue 6 of 8% and hydrosulfite of 4% resolved in 4% aqueous solution of caustic soda (sodium hydroxide) under reduction condition, and then 75 ml 4% aqueous solution of sodium alginate was added and blended in the solution obtained as mentioned above to prepare a coloring liquid.

EXAMPLE 1

A contact lens with 14 mm diameter made of dimethylacrylamide as main material was prepared in swelled condition. Then, the contact lens was bonded on a silk screen (made of nylon) having a circle permeable pattern or image of 8 mm diameter.

Then, the coloring liquid of Preparation Example 1 is applied over the silk screen by means of a hand-spray-gun. After five minutes, the contact lens was taken out and was dipped in water.

As a result, a contact lens having blue circular colored portion at the center thereof was obtained.

Further, the obtained contact lens is attached on the second silk screen having a pattern (permeable pattern) of a letter "R" with 4 mm diameter. Then, the coloring liquid of the Preparation Example 2 was applied in the same manner as the above-mentioned.

As a result, the contact lens having a circular blue colored portion with 8 mm diameter, wherein a dark blue "R" character with 4 mm diameter was clearly printed at the center of the contact lens was obtained.

EXAMPLE 2

A contact lens with 14 mm diameter made of dimethylacrylamide as main material was prepared in swelled condition. Then, the contact lens is bonded on a silk screen (made of nylon) having a pattern or image of a circle with 8 mm diameter (permeable) and numeral of "860" (non-permeable) in the circle.

Then, the coloring liquid of Preparation Example 1 is applied over the silk screen by means of a hand-spray-gun. After five minutes, the contact lens was taken out and was dipped in water.

As a result, a contact lens having blue circular colored portion with 8 mm diameter and having non-colored portion of numeral "860".

As mentioned above, the contact lens of the present invention can moderate dazzling light (sunglass effect) and can be easily found when dropped, since the colored area is provided. Further, since the colored area is provided at only center portion and the periphery is still transparent, the white sclera portion is not covered with the colored area when used, and therefore, the contact lens cannot be easily found by another person.

In addition, since the marks are presented, the user can easily make distinction between right lens and left lens, or between front face and rear face. If the contact lens is a soft contact lens which is easily turned over in convex direction (i.e. the front face turned to a concave surface), the distinction of the faces is important. Further, the devisions and regulations of various kinds of lenses are easy. Further, since the mark or marks, such as indicia, are provided in the center portion of the contact lens, another person cannot easily find also the marks 3, as shown in FIG. 13.

In the present invention, the color of the colored area is not limited to a light-transmittable color. That is to say, non-light-transmittable color can be used for cosmetic use for an artificial eye, a contact lens with iris, or the like.

Through several embodiments of the invention are described with reference to drawings, it is to be understood that the present invention is not limited to the above embodiments, and various changes and modification may be made in the invention without departing from the spirit and scope thereof.

What we claim is:

1. A contact lens, comprising:
   a contact lens body having a substantially circular colored area at a central portion, and an annular transparent portion surrounding said substantially circular colored area, said substantially circular colored area being sufficiently large to completely cover a pupil of an eye and to extend at least partially over an iris of the eye; and
   indicia disposed in said substantially circular colored area.

2. A contact lens of claim 1, wherein said colored area is colored with a light-transmittable color.

3. A contact lens of claim 1, wherein color of said indicia is the same kind of, but deeper than the color of said colored area.

4. A contact lens of claim 1, wherein color of said indicia is different from the color of said colored area.

5. A contact lens of claim 1, wherein said indicia is provided as a non-colored transparent portion.

6. A contact lens of claim 1, wherein diameter of said colored area is 5 to 10 mm.

7. A contact lens of claim 5, wherein area of said non-colored portion is not larger than 10% of whole of said colored area.

8. A contact lens of claim 5, wherein area of said non-colored portion is not larger than 5% of whole of said colored area.

9. A contact lens of claim 1, wherein said indicia has non-symmetric shape.

10. A contact lens of claim 1, wherein said colored area is not light-transmittable.

11. A contact lens of claim 1, wherein said contact lens is a soft contact lens which is easily turned over in convex direction.

12. A contact lens of claim 1, wherein said contact lens is hydrophilic soft contact lens.

13. A contact lens of claim 1, wherein said contact lens is hydrophobic soft contact lens.

14. A contact lens, comprising:
    a contact lens body having a substantially circular colored area at a central portion, and an annular transparent portion surrounding said substantially circular colored area, said substantially circular colored area being sufficiently large to completely cover a pupil of an eye and to extend at least partially over an iris of the eye; and
    indicia disposed in said substantially circular colored area,
    wherein said indicia is formed by a plurality of transparent lines disposed in said substantially circular colored area, said plurality of transparent lines being sufficiently spaced and small in area so that said substantially circular colored area serves as a light filter.

15. A contact lens, comprising:
    a contact lens body having a substantially circular colored area at a central portion, and an annular transparent portion surrounding said substantially circular colored area, said substantially circular colored area being sufficiently large to completely cover a pupil of an eye and to extend at least partially over an iris of the eye; and
    indicia disposed in said substantially circular colored area,
    wherein said indicia is formed by a plurality of dark lines sufficiently spaced apart so that said substantially circular colored area permits visibility therethrough.

* * * * *